(12) United States Patent
Atalla

(10) Patent No.: US 6,318,164 B1
(45) Date of Patent: Nov. 20, 2001

(54) CLUTCH PRESSURE PLATES/DISCS TESTING TOOL

(76) Inventor: Maher A. Atalla, 111034 Dune St., Norwalk, CA (US) 90650

( * ) Notice: Subject to any disclaimer, the term of this patent is extended or adjusted under 35 U.S.C. 154(b) by 0 days.

(21) Appl. No.: 09/569,624

(22) Filed: May 12, 2000

(51) Int. Cl.[7] .................................................. G01M 15/00
(52) U.S. Cl. .......................................... 73/119 R; 33/606
(58) Field of Search .................................. 73/116, 117.2, 73/117.3, 118.1, 119 R; 33/600, 606

(56) References Cited

U.S. PATENT DOCUMENTS

| | | |
|---|---|---|
| D. 215,694 | 10/1969 | Scime . |
| 1,868,675 * | 7/1932 | Spase . |
| 1,984,231 | 12/1934 | Parker et al. . |
| 2,044,067 * | 6/1936 | Eldridge et al. . |
| 2,044,818 * | 6/1936 | Spase . |
| 2,067,442 | 1/1937 | Frisz . |
| 2,487,504 | 11/1949 | Yelkin . |
| 2,655,809 * | 10/1953 | Edens . |
| 3,654,805 * | 4/1972 | Ashby . |
| 3,686,739 * | 8/1972 | Manero . |
| 3,750,251 * | 8/1973 | Pugh et al. . |
| 3,913,395 * | 10/1975 | Brooks . |
| 4,092,770 * | 6/1978 | Polashak . |
| 4,205,421 * | 6/1980 | Martinez-Machin . |
| 4,255,839 | 3/1981 | Shea . |
| 4,916,792 | 4/1990 | Haubus . |
| 5,018,261 * | 5/1991 | Markous . |
| 5,042,135 * | 8/1991 | Kroninger et al. . |
| 5,161,295 * | 11/1992 | Westendorf et al. . |
| 5,295,291 * | 3/1994 | Harris . |
| 5,480,016 * | 1/1996 | Kurz et al. . |
| 6,029,331 * | 2/2000 | Simmons . |
| 6,044,697 * | 4/2000 | Imano . |

* cited by examiner

Primary Examiner—Eric S. McCall

(57) ABSTRACT

A clutch pressure plates/discs testing tool for testing the clutch pressure plates, discs and springs for proper functioning. The clutch pressure plates/discs testing tool includes a cylindrical member having an open first end, a closed second end, a hole centrally-disposed through the second end, and a bore extending therethrough, and further having a threaded outer surface extending along a substantial portion of a length of the cylindrical member; and also includes a handle member securely attached to the cylindrical member at the second end thereof for rotating the cylindrical member; and further includes an alignment assembly for aligning the testing tool relative to pressure plates/discs, and flywheel; and also includes a support bearing member rotatably attached at the first end of the cylindrical member for resting against a clutch pressure plate/disc and for allowing the cylindrical member to be rotated relative to the support bearing member; and further includes arm members, a push nut member and arm linkage member for engaging pressure plates/discs.

10 Claims, 4 Drawing Sheets

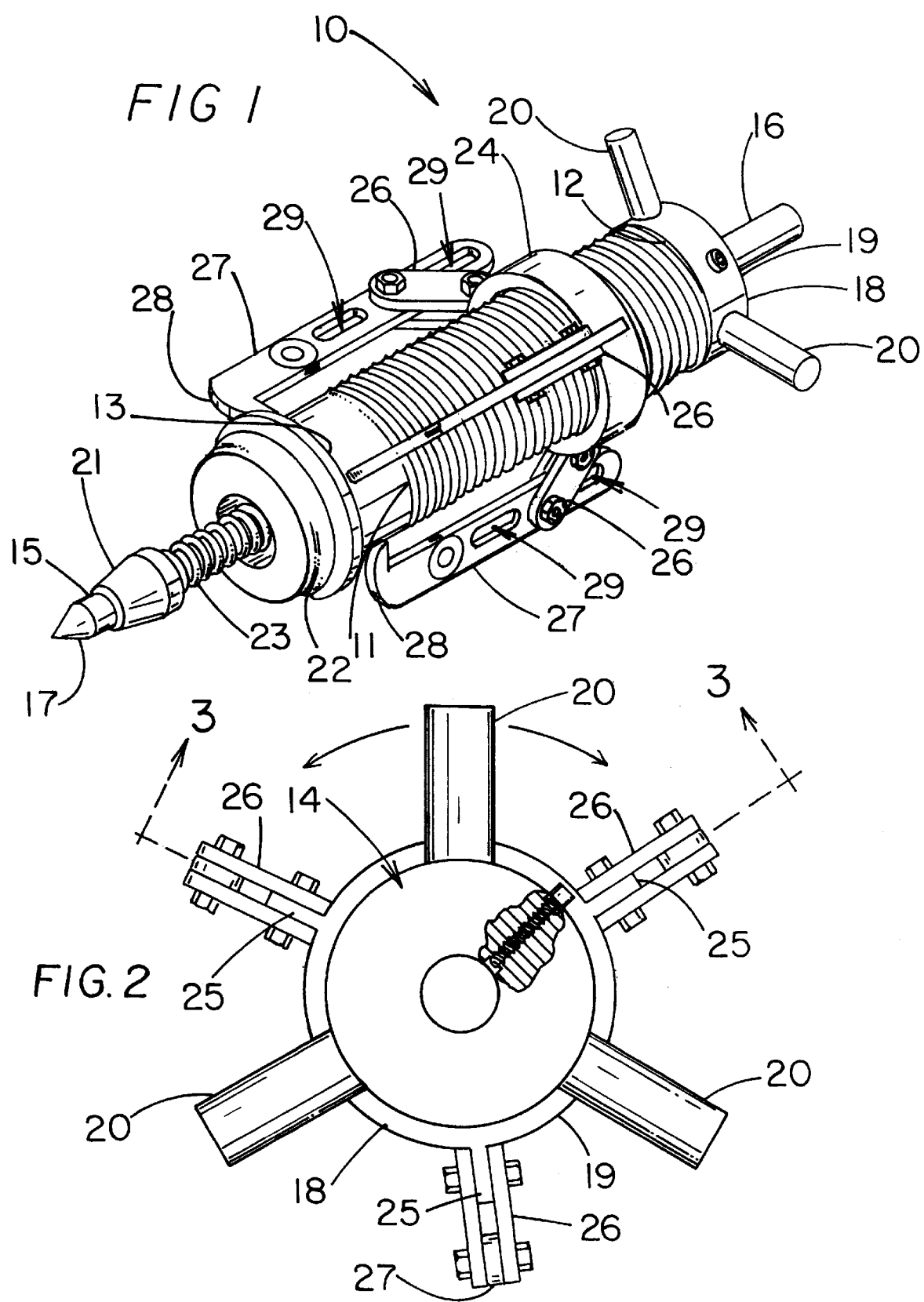

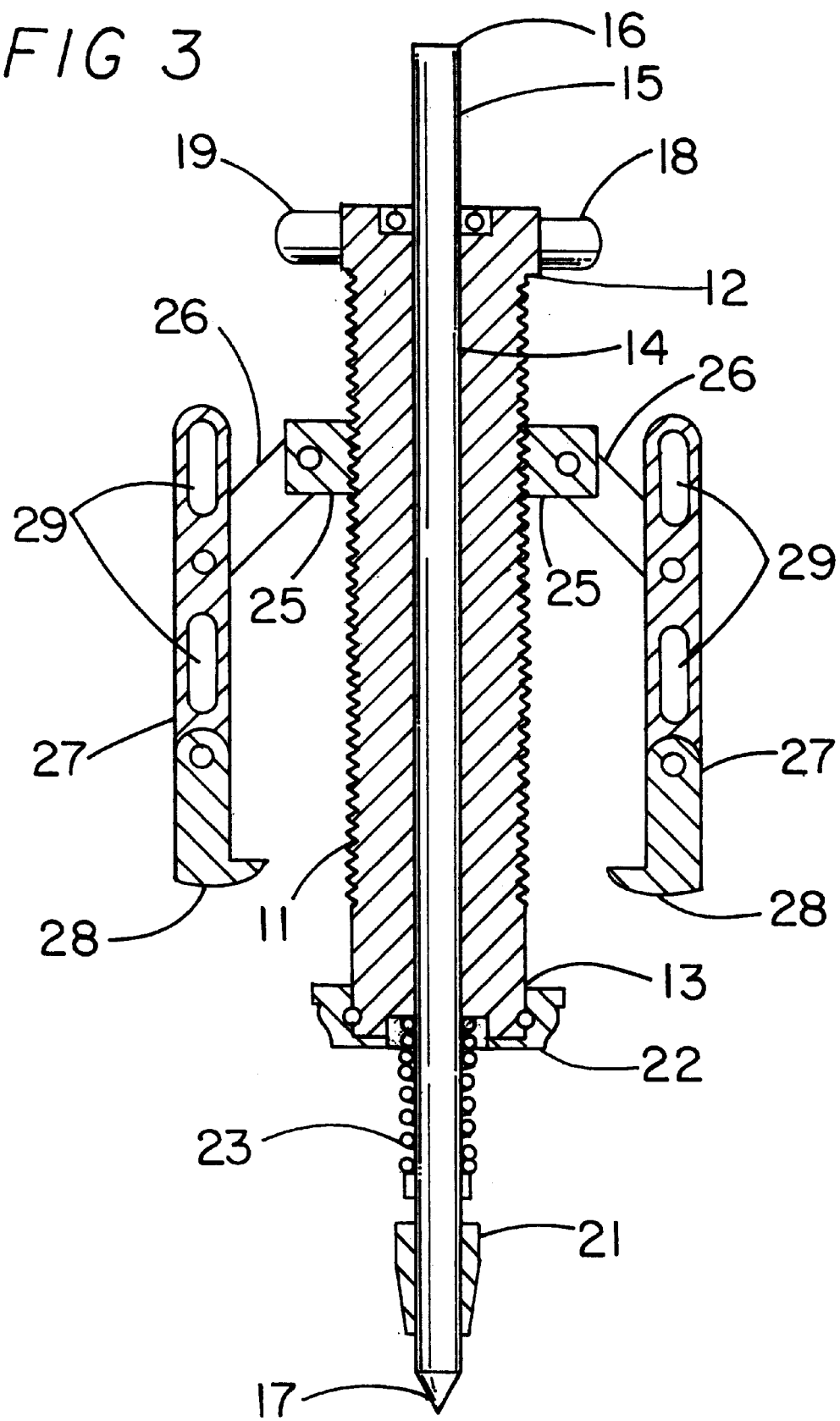

CLUTCH PRESSURE PLATES/DISCS TESTING TOOL

BACKGROUND OF THE INVENTION

1. Field of the Invention

The present invention relates to a clutch master test and more particularly pertains to a new clutch pressure plates/discs testing tool for testing the clutch pressure plates, discs and springs for proper functioning.

2. Description of the Prior Art

The use of a clutch master test is known in the prior art. More specifically, a clutch master test heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,916,792; 4,255,839; 1,984,231; 2,067,442; 2,487,504; and Des. 215,694.

While these devices fulfill their respective, particular objectives and requirements, the aforementioned patents do not disclose a new clutch pressure plates/discs testing tool. The inventive device includes a cylindrical member having an open first end, a closed second end, a hole centrally-disposed through the second end, and a bore extending therethrough, and further having a threaded outer surface extending along a substantial portion of a length of the cylindrical member; and also includes a handle member securely attached to the cylindrical member at the second end thereof for rotating the cylindrical member; and further includes an alignment assembly for aligning the testing tool relative to pressure plates/discs, and flywheel; and also includes a support bearing member rotatably attached at the first end of the cylindrical member for resting against a clutch pressure plate/disc and for allowing the cylindrical member to be rotated relative to the support bearing member; and further includes arm members, a push nut member and arm linkage member for engaging pressure plates/discs.

In these respects, the clutch pressure plates/discs testing tool according to the present invention substantially departs from the conventional concepts and designs of the prior art, and in so doing provides an apparatus primarily developed for the purpose of testing the clutch pressure plates, discs and springs for proper functioning.

SUMMARY OF THE INVENTION

In view of the foregoing disadvantages inherent in the known types of clutch master test now present in the prior art, the present invention provides a new clutch pressure plates/discs testing tool construction wherein the same can be utilized for testing the clutch pressure plates, discs and springs for proper functioning.

The general purpose of the present invention, which will be described subsequently in greater detail, is to provide a new clutch pressure plates/discs testing tool which has many of the advantages of the clutch master test mentioned heretofore and many novel features that result in a new clutch pressure plates/discs testing tool which is not anticipated, rendered obvious, suggested, or even implied by any of the prior art clutch master test, either alone or in any combination thereof.

To attain this, the present invention generally comprises a cylindrical member having an open first end, a closed second end, a hole centrally-disposed through the second end, and a bore extending therethrough, and further having a threaded outer surface extending along a substantial portion of a length of the cylindrical member; and also includes a handle member securely attached to the cylindrical member at the second end thereof for rotating the cylindrical member; and further includes an alignment assembly for aligning the testing tool relative to pressure plates/discs, and flywheel; and also includes a support bearing member rotatably attached at the first end of the cylindrical member for resting against a clutch pressure plate/disc and for allowing the cylindrical member to be rotated relative to the support bearing member; and further includes arm members, a push nut member and arm linkage member for engaging pressure plates/discs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new clutch pressure plates/discs testing tool which has many of the advantages of the clutch master test mentioned heretofore and many novel features that result in a new clutch pressure plates/discs testing tool which is not anticipated, rendered obvious, suggested, or even implied by any of the prior art clutch master test, either alone or in any combination thereof.

It is another object of the present invention to provide a new clutch pressure plates/discs testing tool which may be easily and efficiently manufactured and marketed.

It is a further object of the present invention to provide a new clutch pressure plates/discs testing tool which is of a durable and reliable construction.

An even further object of the present invention is to provide a new clutch pressure plates/discs testing tool which is susceptible of a low cost of manufacture with regard to both materials and labor, and which accordingly is then susceptible of low prices of sale to the consuming public, thereby making such clutch pressure plates/discs testing tool economically available to the buying public.

Still yet another object of the present invention is to provide a new clutch pressure plates/discs testing tool which provides in the apparatuses and methods of the prior art some of the advantages thereof, while simultaneously overcoming some of the disadvantages normally associated therewith.

Still another object of the present invention is to provide a new clutch pressure plates/discs testing tool for testing the clutch pressure plates, discs and springs for proper functioning.

Yet another object of the present invention is to provide a new clutch pressure plates/discs testing tool which includes a cylindrical member having an open first end, a closed second end, a hole centrally-disposed through the second end, and a bore extending therethrough, and further having a threaded outer surface extending along a substantial portion of a length of the cylindrical member; and also includes a handle member securely attached to the cylindrical member at the second end thereof for rotating the cylindrical member; and further includes an alignment assembly for aligning the testing tool relative to pressure plates/discs, and flywheel; and also includes a support bearing member rotatably attached at the first end of the cylindrical member for resting against a clutch pressure plate/disc and for allowing the cylindrical member to be rotated relative to the support bearing member; and further includes arm members, a push nut member and arm linkage member for engaging pressure plates/discs.

Still yet another object of the present invention is to provide a new clutch pressure plates/discs testing tool that saves the user a substantial amount of time when having to reassemble the transmission.

Even still another object of the present invention is to provide a new clutch pressure plates/discs testing tool that is easy and convenient to use and determine whether or not the related components of the transmission are still working properly.

These together with other objects of the invention, along with the various features of novelty which characterize the invention, are pointed out with particularity in the claims annexed to and forming a part of this disclosure. For a better understanding of the invention, its operating advantages and the specific objects attained by its uses; reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new clutch pressure plates/discs testing tool according to the present invention.

FIG. 2 is a top plan view of the present invention.

FIG. 3 is a cross-sectional view of the present invention.

DESCRIPTION OF THE PREFERRED EMBODIMENT

Figure 4:
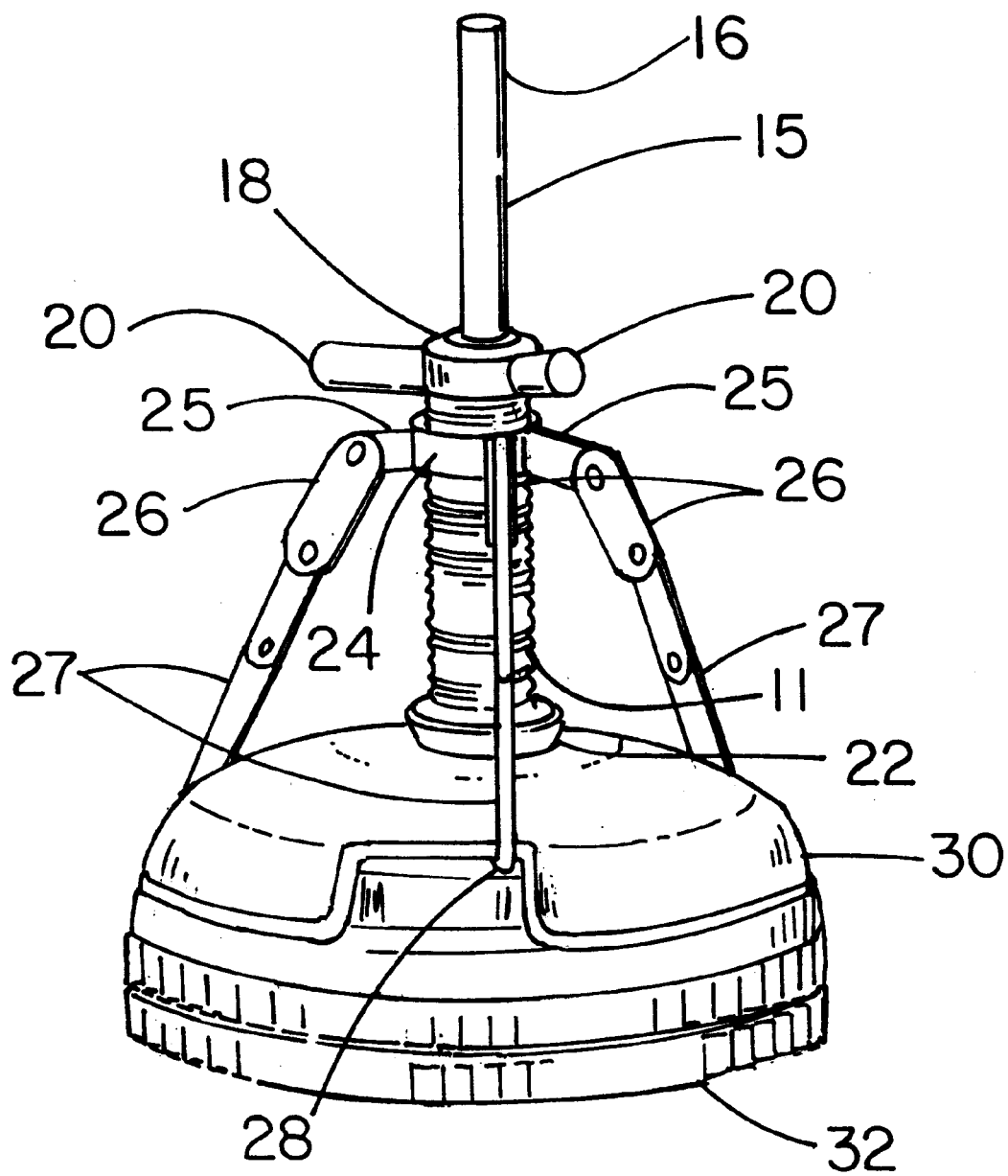
FIG. 4 is a perspective view of the present invention in use.
Figure 5:
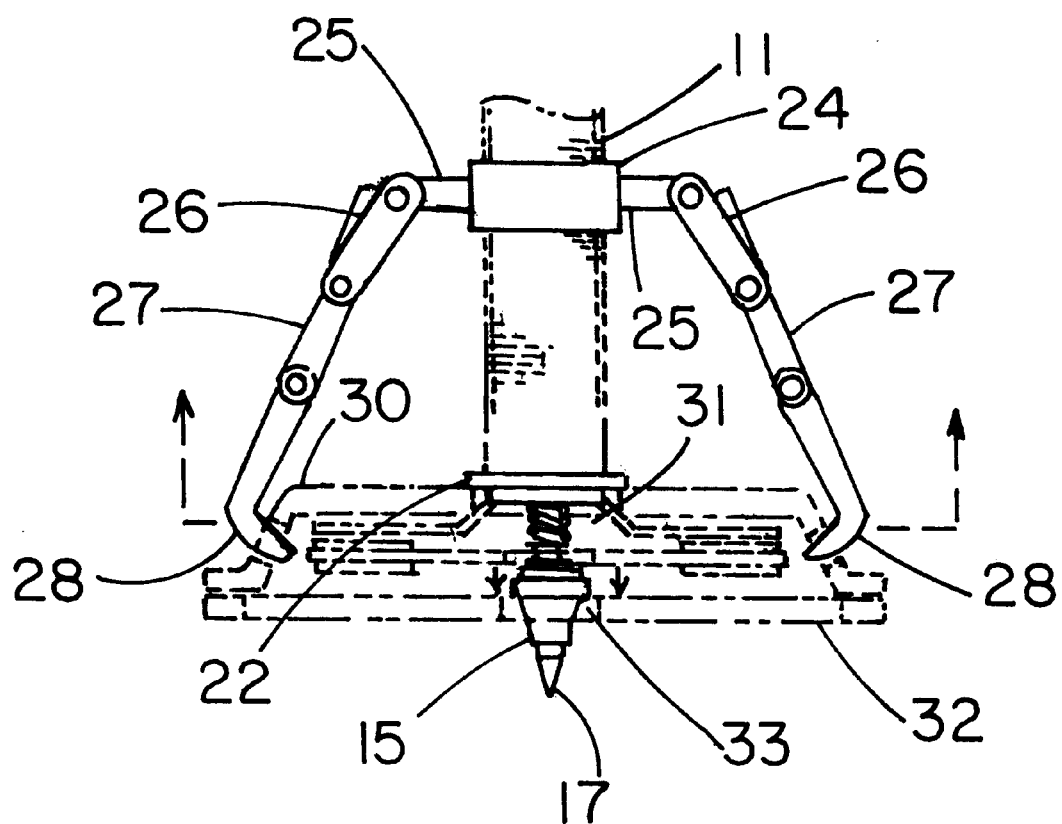
FIG. 5 is a cross-sectional view of the present invention in use.

With reference now to the drawings, and in particular to FIGS. 1 through 5 thereof, a new clutch pressure plates/discs testing tool embodying the principles and concepts of the present invention and generally designated by the reference numeral 10 will be described.

As best illustrated in FIGS. 1 through 5, the clutch pressure plates/discs testing tool 10 generally comprises a cylindrical member 11 having an open first end 13, a closed second end 12, a hole centrally-disposed through the second end 12, and a bore 14 extending therethrough and further having a threaded outer surface extending along a substantial portion of a length of the cylindrical member 11. The cylindrical member 11 has a length of approximately 12 inches and a diameter of approximately 3 inches. A handle member 18 is securely and conventionally attached with a fastener to the cylindrical member 11 at the second end 12 thereof. The handle member 18 includes a ring member 19 being securely and conventionally fastened at the second end 12 of the cylindrical member 11, and also includes a plurality of stub members 20 being spaced apart and integrally extending outwardly from the ring member 19. An alignment means for aligning the testing tool relative to pressure plates/discs and flywheel includes a shaft 15 having a first end 17 and being slidably disposed in the bore of the cylindrical member 11 and through the first 13 and second 12 ends of the cylindrical member 11, and also includes a spring 23 mounted about the shaft 15 for biasing the shaft 15 through the first end 13 of the cylindrical member 11 and through the support bearing member 22, and further includes a collar 21 slidably mounted about the shaft 15 between the first end 17 of the shaft 15 and the spring 23 for facilitating the alignment of the testing tool 10. The shaft also has a second end portion 16 which is movably received through the hole in the second end 12 of the cylindrical member 11. The first end 17 of the shaft 15 is essentially tapered for extending through holes 31,33 in the plates/discs 30 and flywheel 32 to align the testing tool 10. The collar 21 includes a bottom portion which is tapered outwardly from a bottom of the collar 21 to a top of the bottom portion. A support bearing member 22 is rotatably attached at the first end 13 of the cylindrical member 11 for resting against a clutch pressure plate/disc 30 and for allowing the cylindrical member 11 to be rotated relative to the support bearing member 22, a means for engaging a clutch pressure plate/ disc 30 includes a push nut member 24 being threaded upon the cylindrical member 11 for movement therealong and having bracket-like portions 25 spaced apart and integrally extending outwardly therefrom, and also includes a plurality of arm linkage members 26 each of which is pivotally attached to a respective one of the bracket-like portions 25, and further includes a plurality of arm members 27 each of which is pivotally attached to a respective one of the arm linkage members 26. Each of the arm members 27 includes a first end which has a jaw-like portion 28 being adapted to engage a rim of a clutch pressure plate/disc 30. Each of the arm members includes a plurality of longitudinal slots 29 spaced apart and extending therethrough for adjustably attaching the arm members 27 to the arm linkage members 26. Preferably, there are three arm members 27 for attaching to a pressure plate/disc.

In use, the user extends the first end 17 of the shaft 15 through the centrally-disposed holes 31,33 in the clutch pressure plates 30 and the flywheel 32 with the tapered first end 17 of the shaft 15 and the collar 21 being used to align the clutch pressure plates/discs testing tool 10 upon the outermost clutch pressure plate/disc 30. The user then engages the jaw-like portions 28 of the arm members 27 about the rim of the outermost clutch pressure plate/disc 30, and turns the handle member 18 which rotates the cylindrical member 11 upon the support bearing member 22 relative to the arm members 27 to essentially urge the push nut member 24 and arm members 27 and perimeter of the clutch pressure plate/disc 30 toward the second end 12 of the cylindrical member 11 thus releasing the tension of the spring of the clutch pressure plate/disc 30. If working, the clutch pressure plate/disc 30 should be loose and easy to turn.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A clutch pressure plates/discs testing tool comprising:
    a cylindrical member having an open first end, a closed second end, a hole centrally-disposed through said second end, and a bore extending therethrough, and further having a threaded outer surface extending along a substantial portion of a length of said cylindrical member;
    a handle member securely attached to said cylindrical member at said second end thereof for rotating said cylindrical member;
    an alignment means for aligning said testing tool relative to pressure plates/discs, and flywheel;
    a support bearing member rotatably attached at said second end of said cylindrical member for resting against a clutch pressure plate/disc and for allowing said cylindrical member to be rotated relative to said support bearing member; and
    a means for engaging a clutch pressure plate/disc.

2. A clutch pressure plates/discs testing tool as described in claim 1, wherein said alignment means includes a shaft being slidably having a first end and being disposed in said bore and through said first and second ends of said cylindrical member, and also includes a spring mounted about said shaft for biasing said shaft through said first end of said cylindrical member and through said support bearing member, and further includes a collar slidably mounted about said shaft between said first end of said shaft and said spring for facilitating the alignment of said testing tool, said shaft also having a second end portion which is movably received through said hole in said second end of said cylindrical member.

3. A clutch pressure plates/discs testing tool as described in claim 2, wherein said first end of said shaft is essentially tapered for extending through holes in the plates/discs and flywheel to align said testing tool.

4. A clutch pressure plates/discs testing tool as described in claim 3, wherein said collar includes a bottom portion which is tapered outwardly from a bottom of said collar to a top of said bottom portion.

5. A clutch pressure plates/discs testing tool as described in claim 4, wherein said means for engaging a clutch pressure plate/disc includes a push nut member being threaded upon said cylindrical member for movement therealong and having bracket-like portions spaced apart and extending outwardly therefrom; and also includes a plurality of arm linkage members each of which is pivotally attached to a respective one of said bracket-like portions; and further includes a plurality of arm members each of which is pivotally attached to a respective one of said arm linkage members.

6. A clutch pressure plates/discs testing tool as described in claim 5, wherein each of said arm members includes a first end which has a jaw-like portion being adapted to engage a rim of a clutch pressure plate/disc.

7. A clutch pressure plates/discs testing tool as described in claim 6, wherein each of said arm members includes a plurality of longitudinal slots spaced apart and extending therethrough for adjustably attaching said arm members to said arm linkage members.

8. A clutch pressure plates/discs testing tool as described in claim 7, wherein said handle member includes a ring member being securely fastened at said second end of said cylindrical member, and also includes a plurality of stub members being spaced apart and extending outwardly from said ring member.

9. A clutch pressure plates/discs testing tool as described in claim 8, wherein said spring is adapted to abut against said closed second end of said cylindrical member.

10. A clutch pressure plates/discs testing tool comprising:
    a cylindrical member having an open first end, a closed second end, a hole centrally-disposed through said second end, and a bore extending therethrough and further having a threaded outer surface extending along a substantial portion of a length of said cylindrical member, said cylindrical member having a length of approximately 12 inches and a diameter of approximately 3 inches;
    a handle member securely attached to said cylindrical member at said second end thereof, said handle member including a ring member being securely fastened at said second end of said cylindrical member, and also including a plurality of stub members being spaced apart and extending outwardly from said ring member;
    an alignment means for aligning said testing tool relative to pressure plates/discs, and flywheel means including a shaft being slidably having a first end and being disposed in said bore and through said first and second ends of said cylindrical member, and also including a spring mounted about said shaft for biasing said shaft through said first end of said cylindrical member, and further including a collar slidably mounted about said shaft between said first end of said shaft and said spring for facilitating the alignment of said testing tool, said shaft also having a second end portion which is movably received through said hole in said second end of said cylindrical member, said first end of said shaft being essentially tapered for extending through holes in the plates/discs and flywheel to align said testing tool, said collar including a bottom portion which is tapered outwardly from a bottom of said collar to a top of said bottom portion;
    a support bearing member rotatably attached at said second end of said cylindrical member for resting against a clutch pressure plate/disc and for allowing said cylindrical member to be rotated relative to said support bearing member, said shaft being slidably extended through said support bearing member; and a means for engaging a clutch pressure plate including a push nut member being threaded upon said cylindrical member for movement therealong and having bracket-like portions spaced apart and extending outwardly therefrom; and also including a plurality of arm linkage members each of which is pivotally attached to a respective one of said bracket-like portions; and further including a plurality of arm members each of which is pivotally attached to a respective one of said arm linkage members, each of said arm members including a first end which has a jaw-like portion being adapted to engage a rim of a clutch pressure plate, each of said arm members including a plurality of longitudinal slots spaced apart and extending therethrough for adjustably attaching said arm members to said arm linkage members, said arm members including three of said arm members.

* * * * *